United States Patent
Krick

(10) Patent No.: US 7,306,076 B1
(45) Date of Patent: Dec. 11, 2007

(54) CRUSH-PROOF CATCH PAN FOR ENGINE OIL

(76) Inventor: Daphne Krick, 211 Rankin St., Fayetteville, NC (US) 28301

( * ) Notice: Subject to any disclaimer, the term of this patent is extended or adjusted under 35 U.S.C. 154(b) by 830 days.

(21) Appl. No.: 10/405,723

(22) Filed: Apr. 2, 2003

(51) Int. Cl.
*F16N 31/00* (2006.01)
*B65D 1/34* (2006.01)

(52) U.S. Cl. .............. 184/106; 180/69.1; 296/38; 220/573; 220/DIG. 6

(58) Field of Classification Search ........ 206/223, 206/319, 335, 204, 205; 24/3.13, 299, 302, 24/298, 684; 220/696, DIG. 12, 659; 224/488, 224/572, 402, 496; 184/106
See application file for complete search history.

(56) References Cited

U.S. PATENT DOCUMENTS

| | | | |
|---|---|---|---|
| D149,472 S * | 5/1948 | Chernow | D11/87 |
| 2,779,523 A * | 1/1957 | Klimkiewicz | 224/220 |
| 3,785,451 A * | 1/1974 | McCord | 180/69.1 |
| 3,944,199 A | 3/1976 | Johnson | |
| 4,114,234 A * | 9/1978 | Hogenson | 16/411 |
| 4,484,661 A * | 11/1984 | Evenson | 184/106 |
| 4,524,866 A | 6/1985 | Pollacco | |
| 4,533,042 A | 8/1985 | Pollacco | |
| 4,616,762 A * | 10/1986 | Alexander | 220/658 |
| 4,651,887 A | 3/1987 | Patrick | |
| 4,750,775 A | 6/1988 | Miller | |
| 4,875,537 A * | 10/1989 | Garnatz et al. | 180/69.1 |
| 5,020,638 A * | 6/1991 | Smith | 184/106 |
| 5,392,948 A * | 2/1995 | McEntee | 220/669 |
| 5,404,848 A * | 4/1995 | Nelson | 123/198 E |
| 5,536,211 A | 7/1996 | Kelly | |
| 5,653,205 A | 8/1997 | Ozeki | |
| 5,704,819 A | 1/1998 | Isogawa | |
| 5,711,402 A * | 1/1998 | Sumpter, Sr. | 184/106 |
| 5,863,424 A * | 1/1999 | Lee | 210/168 |
| 6,273,049 B1 | 8/2001 | Okuda et al. | |
| 6,349,575 B1 * | 2/2002 | Bentley | 70/18 |
| 6,488,844 B2 | 12/2002 | Willis et al. | |
| 6,604,390 B1 * | 8/2003 | Nooner | 70/63 |

* cited by examiner

*Primary Examiner*—Jila M Mohandesi
(74) *Attorney, Agent, or Firm*—Coats & Bennett, P.L.L.C.

(57) ABSTRACT

A waste oil container includes an oil catch pan for collecting oil that leaks from a parked vehicle and a leash for attaching the oil catch pan to the vehicle. The oil catch pan includes a bottom, a surrounding wall structure, and an open top. The oil catch pan is integrally formed of a crush-resistant material that is self-supporting, is sufficiently flexible to collapse without breaking when crushing force is applied, and is sufficiently resilient to return to an original condition when the crushing force is removed. The oil catch pan is sized to fit underneath a parked vehicle to collect oil leaking from the vehicle and can be stored within the vehicle without unleashing the oil catch pan when the vehicle is being driven.

30 Claims, 4 Drawing Sheets ic # CRUSH-PROOF CATCH PAN FOR ENGINE OIL

FIELD OF THE INVENTION

The present invention relates generally to a catch pan for catching and holding oil which is leaked or drained from an engine and, more particularly, to a crush proof catch pan including a leash for securing the catch pan to a vehicle.

BACKGROUND OF THE INVENTION

The leakage of oil from the engines of parked vehicles is a common problem. The oil not only leaves unsightly stains on roads, driveways, and parking lots, but also contributes to contamination of soil and water. The visual and environmental contamination can be easily avoided by placing a catch pan underneath the vehicle whenever the vehicle is parked to catch any oil that leaks from the engine. The U.S. military requires, for example, that catch pans be placed under certain types of parked vehicles.

One problem encountered with the use of catch pans underneath parked vehicles is that the vehicle driver sometimes forgets about the catch pan and drives away, crushing the catch pan. If the catch pan is not crushed by the vehicle, the catch pan may be left behind and it may not be possible to later retrieve the catch pan. Therefore, it would be highly desirable to provide a catch pan that is both crush-proof and has means to prevent inadvertent abandonment by the driver.

BRIEF SUMMARY OF THE INVENTION

The present invention provides a catch pan adapted to be placed underneath parked vehicles to catch oil that leaks or drains from the engine while the vehicle is parked. The catch pan is preferably molded as a single piece from a material that is both crush-proof and has sufficient rigidity to be self-supporting. Suitable materials for the construction of the catch pan include both natural and synthetic rubbers.

In another aspect of the invention, a leash is provided for securing the catch pan to a vehicle. In one preferred embodiment of the invention, the leash comprises a chain having a hook at one end for engaging an eyelet or grommet on the catch pan. The opposite end of the chain is provided with a means for attaching the chain to a part of the vehicle. The attaching means may comprise a ring and catch member. The catch member attaches to the free end of the chain and the ring attaches to the chain at a predetermined distance from the end. A loop can be formed at the end of the chain by passing the catch member through the ring. Thus, the chain can be looped around any available part of the vehicle, such as a frame member, to secure the catch pan to the vehicle.

DETAILED DESCRIPTION OF THE INVENTION

Figure 1:
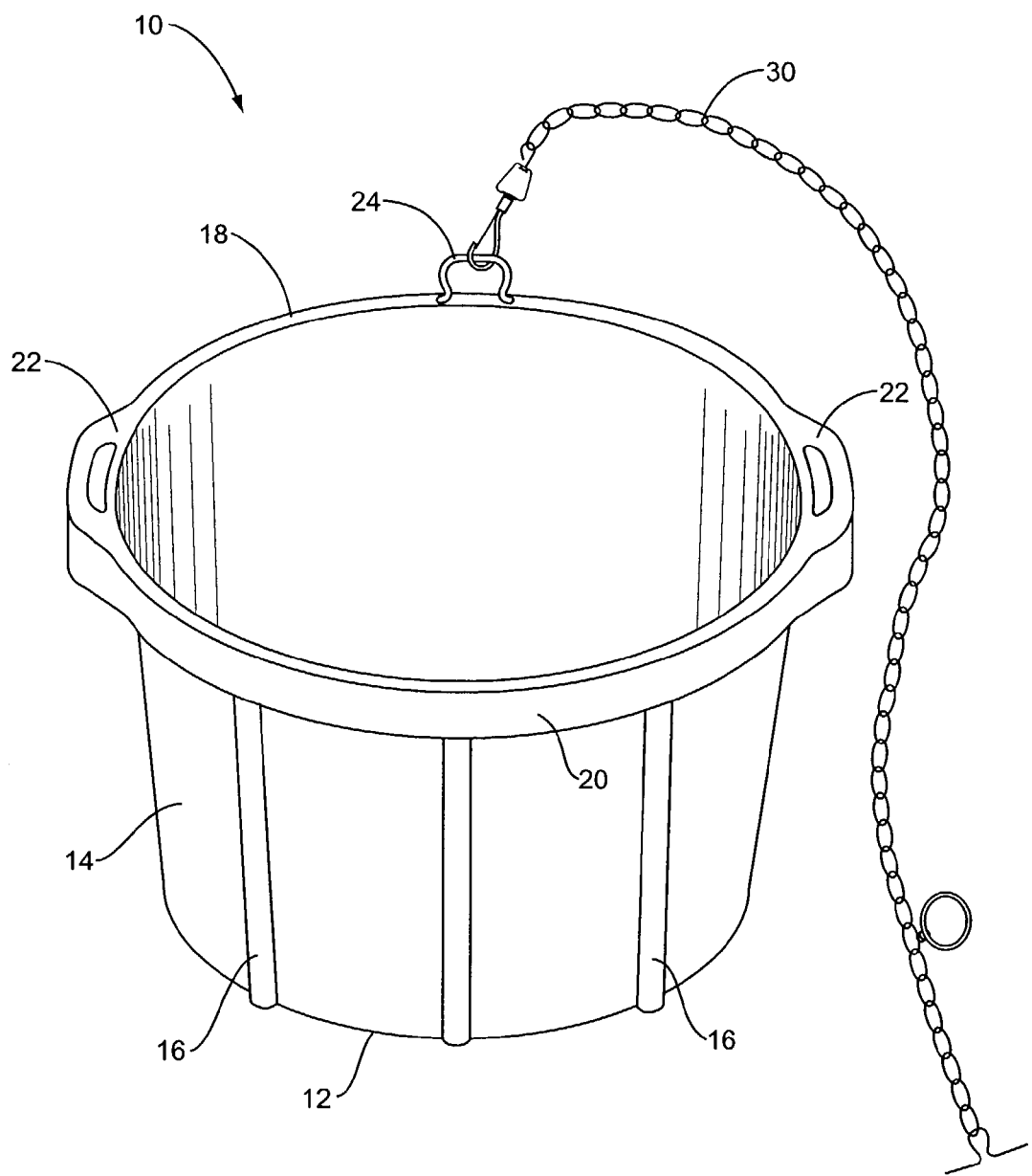
FIG. 1 is a perspective view illustrating the catch pan according to the present invention.

Referring now to the drawings, and particularly to FIG. 1, a crush proof catch pan according to one exemplary embodiment of the present invention is shown therein and indicated generally by the numeral 10. The catch pan 10 is molded as a single piece from a material that is both crush proof and self-supporting. One suitable material for the catch pan 10 is fiber-reinforced rubber. The catch pan 10 has a generally circular configuration and includes a bottom 12 and surrounding sidewall 14. The sidewall 14 tapers outward slightly from the bottom 12 towards the open top. The sidewall 14 may include vertically-extending support ribs to increase the rigidity of the sidewall 14. A circular rim 18 extends outwardly from the upper end of the sidewall 14. A flange 20 extends downwardly from the outer edge or periphery of the rim 18. The rim 18 and flange 20 help in maintaining the circular shape of the catch pan 10. In one preferred embodiment of the invention, gripping handles 22 may be integrally formed with the rim 18 and flange 20 for lifting and carrying the catch pan 10.

Figure 3:
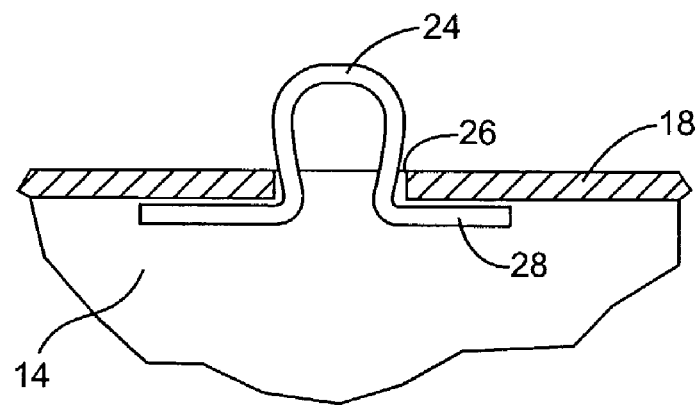
FIG. 3 is a section view of a sidewall of the catch pan.
Figure 4:
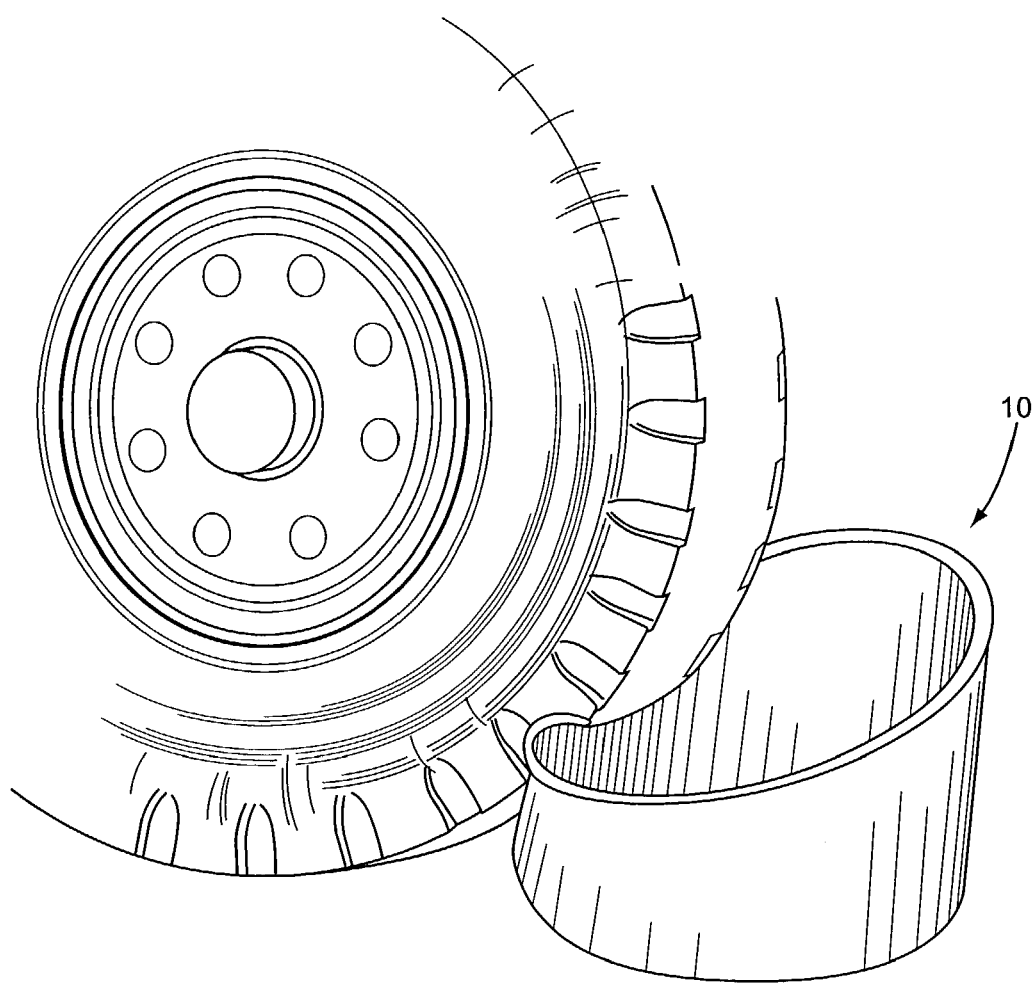
FIG. 4 is another section view taken through the rim of the catch pan.

An eyelet 24 is secured to the rim 18 of catch pan 10 for connecting the leash 30 to the catch pan 10. As shown in FIGS. 3 and 4, the eyelet 24 is pressed through a narrow opening 26 in the rim 18. Projecting arms 28 on the eyelet 24 prevent the eyelet 24 from being pulled all the way through the opening 26. In an alternate embodiment, the eyelet 24 may simply comprise a metal grommet or ring in the rim 18 of the catch pan 10.

Figure 2:
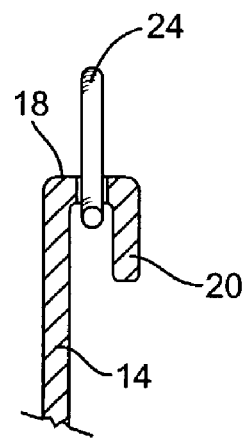
FIG. 2 is a perspective view illustrating the catch pan being crushed underneath the wheel of a vehicle.

One of the advantages of the catch pan 10 of the present invention is its ability to withstand crushing forces that may be encountered, for example, when the catch pan 10 is run over by a vehicle. FIG. 2 illustrates the ability of the catch pan 10 to withstand crushing forces. FIG. 2 illustrates the catch pan 10 being crushed underneath the wheel of a vehicle. As seen in FIG. 2, the sidewall 14 of the catch pan 10 collapses without cracking or breaking when a crushing force is applied to the sidewalls 14. When the crushing force is removed, the sidewalls 14 have sufficient resiliency to return to their original position without any significant distortion.

Catch pan 10 is further provided with a leash 30 for securing the catch pan to a vehicle. The leash 30 may comprise a rope, cord, cable, chain, or other elongated flexible member. One end of the leash secures to the catch pan 10. The opposite end of the leash 30 secures to the vehicle. Preferably, the leash 30 is sufficiently long to allow the catch pan 10 to be placed underneath the vehicle or within the vehicle without being detached from the vehicle. The catch pan 10 may, for example, be stored in the bed of a truck. When the vehicle is parked, the catch pan 10 can be removed from its storage location within the vehicle and placed underneath the vehicle. When the driver is ready to leave, the catch pan 10 can be removed from underneath the vehicle and placed back in its storage position without unleashing the catch pan 10 from the vehicle. If the driver forgets to remove the catch pan 10 from underneath the vehicle, the catch pan 10 will be simply dragged with the vehicle. Dragging the catch pan 10 does not present a hazard but will likely alert the driver, who can then stop the vehicle and place the catch pan 10 in its storage position.

Figure 5:
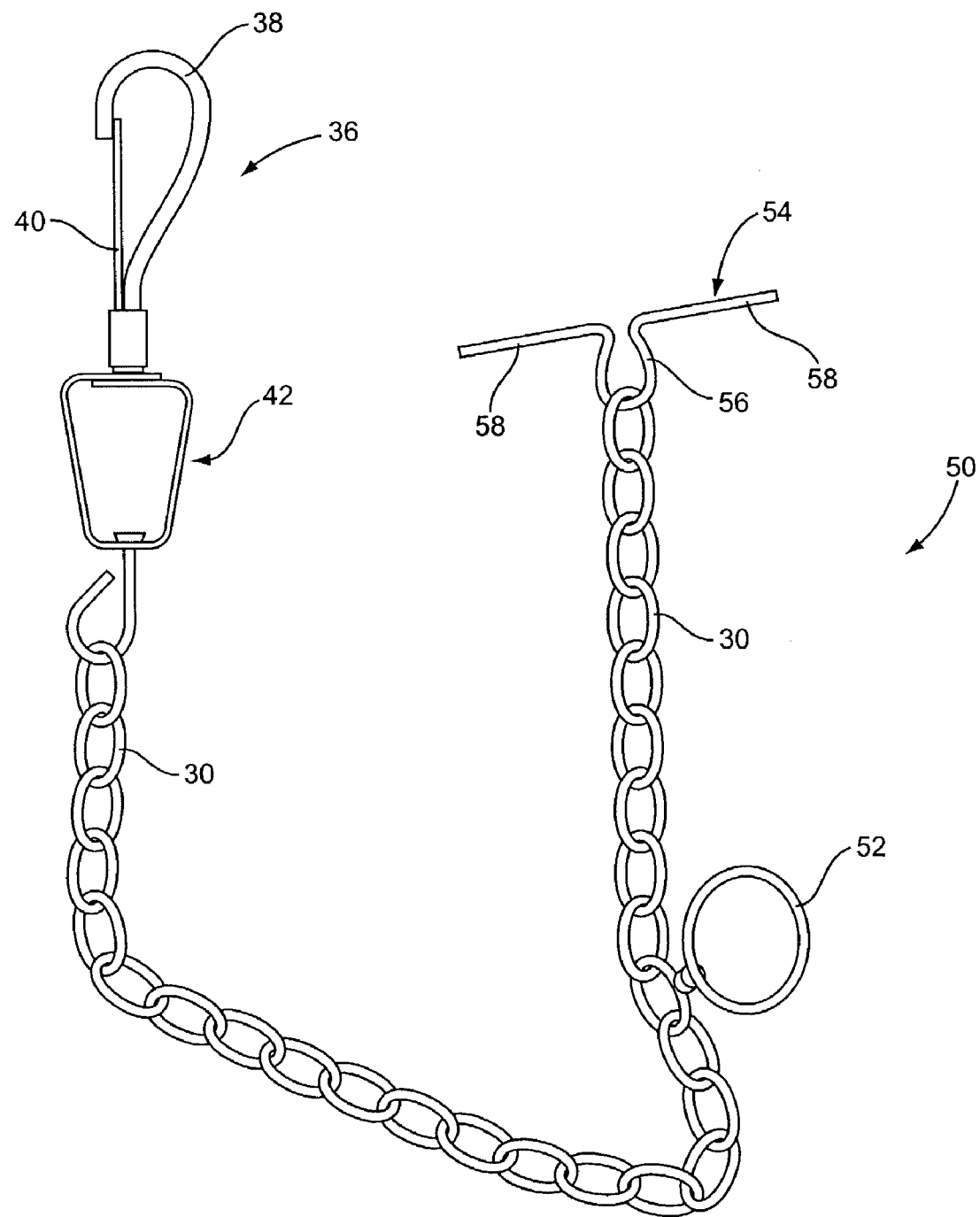
FIG. 5 is an illustration of the leash for securing the catch pan to a vehicle.

FIG. 5 illustrates an exemplary embodiment of an exemplary leash 30 for use with the catch pan 10. In the embodiment shown in FIG. 5, the leash 30 comprises a metal chain 32 having a plurality of links 34. A hook assembly 36 is secured at one end of the chain 32. A ring and catch assembly 50 is attached to the opposite end of the chain 32. The hook assembly 36 and ring and catch assembly 50 each function as an attachment means for attaching the leash 30 to either the catch pan 10 or the vehicle.

The hook assembly 36 comprises a hook member 38, closure element 40, and swivel assembly 42. The hook member 38 is adapted to engage the eyelet 24 that is secured to the rim 18 of the catch pan 10. Closure element 40 comprises a strap of resilient metal that closes the hook member 38. The closure element 40 normally assumes a closed position as shown in FIG. 5. The closure element 40 can be moved to an open position, allowing the hook member 38 to be engaged or disengaged from the eyelet 24 by pressing inward on the closure element 40. The swivel assembly 42 allows the hook member 38 to rotate a full 3600 about an axis that is substantially coincident with the chain 32 when the chain 32 is stretched out.

The ring and catch assembly 50 comprises a ring member 52 and catch element 54. Ring member 52 comprises a metal ring 56 that is adapted to engage with the links 34 of the chain 32. The catch element 54 is made of a metal rod approximately ⅛th inch in diameter. The catch element 54 includes a loop 58 in the center thereof with outwardly-projecting arms 60. The catch element 54 is sized so that it passes endwise through the ring member 52. After passing through the ring member 52, the catch element 54 is oriented such that the arms 60 engage the ring member 52 and prevent the catch element 54 from passing back through the ring member 52. In this manner, a loop can be formed in the end of the chain 32. By forming such a loop around a part of the vehicle, the chain 32 can be secured to the vehicle. For example, a loop may be formed around a frame member underneath the vehicle or around a door handle.

Those skilled in the art will appreciate that the functions of the hook assembly 36 and ring and catch assembly 50 can be reversed. That is, the ring and catch assembly 50 can be used to secure the chain 32 to the catch pan 10 and the hook assembly 36 can be used to secure the chain 32 to the vehicle. In this case, the eyelet 24 would need to be sized to allow the catch element 54 to pass therethrough in a first orientation. The hook member 38 can also be engaged with a link 34 of the chain 32 to form a loop in the chain 32 around a part of the vehicle to fasten the chain 32 to the vehicle.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A waste oil container comprising:
   a) an oil catch pan having a bottom, a surrounding wall structure, and an open top, the pan being sized to fit underneath a parked vehicle to collect oil leaking from the vehicle, the pan further being integrally formed of a crush-resistant material that is self-supporting, is sufficiently flexible to collapse without breaking when crushing force is applied, and is sufficiently resilient to return to an original condition when the crushing force is removed; and
   b) a leash connected to the pan for securing the pan to the vehicle.

2. The waste oil container of claim 1 wherein the pan is made of fiber-reinforced rubber.

3. The waste oil container of claim 1 wherein the pan further includes an integrally formed rim.

4. The waste oil container of claim 3 wherein the rim includes integrally formed handles for lifting the oil catch pan.

5. The waste oil container of claim 4 wherein the leash secures to the integrally formed rim of the pan.

6. The waste oil container of claim 5 wherein the pan further includes an eyelet disposed in the rim and wherein the leash secures to the eyelet.

7. The waste oil container of claim 1 wherein the leash includes an elongate flexible member and a hook member at a first end thereof.

8. The waste oil container of claim 7 wherein the leash further includes a swivel mount connecting the hook member to the elongate member.

9. The waste oil container of claim 7 wherein the leash further includes a ring and catch assembly connected adjacent a second end of the elongate flexible member.

10. The waste oil container of claim 9 wherein the ring and catch assembly comprises a ring member attached adjacent the second end of the elongate flexible member and a catch element attached to the second end, wherein the catch element is adapted to pass through the ring member in a first orientation and to engage the ring member in a second orientation.

11. The waste oil container of claim 1 wherein the leash comprises an elongated flexible line that interconnects the pan with a vehicle, and wherein the elongated flexible line is of a sufficient length to permit the pan to be placed underneath the vehicle and move to a stored position within the vehicle without requiring the uncoupling of the line from the vehicle, whereby the line can remain attached to the vehicle and the pan can be moved back and forth between a position underneath the vehicle and a stored position within the vehicle without having to detach the line from the vehicle.

12. The waste oil container of claim 11 wherein the elongated flexible line includes an elongated chain.

13. The waste oil container of claim 1 wherein the pan further includes an integrally formed rim that extends around the open top and wherein the rim has a thickness greater than the thickness of the surrounding wall structure of the pan; and a plurality of circumferentially spaced vertical ribs integrally formed with the pan and extending between the bottom and the rim.

14. A waste oil container comprising:
   a) an oil catch pan having a bottom, a surrounding wall structure, and an open top, the pan being sized to fit underneath a parked vehicle to collect oil leaking from the vehicle, the pan further being integrally formed of a crush-resistant material that is self-supporting, is sufficiently flexible to collapse without breaking when crushing force is applied, and is sufficiently resilient to return to an original condition when the crushing force is removed; and
   b) attaching means for securing the pan to the vehicle.

15. The waste oil container of claim 14 wherein the pan is made of fiber-reinforced rubber.

16. The waste oil container of claim 14 wherein the pan further includes an integrally formed rim.

17. The waste oil container of claim 16 wherein the rim includes integrally formed handles for lifting the oil catch pan.

18. The waste oil container of claim 17 wherein the leash secures to the integrally formed rim of the pan.

19. The waste oil container of claim 18 wherein the pan further includes an eyelet disposed in the rim and wherein the leash secures to the eyelet.

20. The waste oil container of claim 14 wherein the attaching means comprises an elongate flexible member and a hook member at a first end thereof.

21. The waste oil container of claim 20 wherein the attaching means further comprises a swivel mount connecting the hook member to the elongate member.

22. The waste oil container of claim 20 wherein the attaching means further comprises a ring and catch assembly connected adjacent a second end of the elongate flexible member.

23. The waste oil container of claim 22 wherein the ring and catch assembly comprises a ring member attached adjacent the second end of the elongate flexible member and a catch element attached to the second end, wherein the catch element is adapted to pass through the ring member in a first orientation and to engage the ring member in a second orientation.

24. The waste oil container of claim 14 wherein the attaching means comprises a leash that comprises an elongated flexible line that interconnects the pan with a vehicle, and wherein the elongated flexible line is of a sufficient length to permit the pan to be placed underneath the vehicle and move to a stored position within the vehicle without requiring the uncoupling of the line from the vehicle, whereby the line can remain attached to the vehicle and the pan can be moved back and forth between a position underneath the vehicle and a stored position within the vehicle without having to detach the line from the vehicle.

25. The waste oil container of claim 24 wherein the elongated flexible line includes an elongated chain.

26. The waste oil container of claim 14 wherein the pan further includes an integrally formed rim that extends around the open top and wherein the rim has a thickness greater than the thickness of the surrounding wall structure of the pan; and a plurality of circumferentially spaced vertical ribs integrally formed with the pan and extending between the bottom and the rim.

27. A method of collecting waste oil leaking from a parked vehicle comprising:
   a) placing an oil catch pan underneath the vehicle when the vehicle is parked;
   b) securing the oil catch pan to the vehicle with a leash;
   c) removing the oil catch pan from underneath the vehicle and storing the oil catch pan within the vehicle without unleashing the oil catch pan when the vehicle is being driven.

28. The method of claim 27 wherein the oil catch pan is integrally formed of a crush-resistant material that is self-supporting, is sufficiently flexible to collapse without breaking when crushing force is applied, and is sufficiently resilient to return to an original condition when the crushing force is removed.

29. The method of claim 27 wherein the leash comprises an elongated flexible line that interconnects the oil catch pan with the vehicle, and wherein the elongated flexible line is of a sufficient length to permit the pan to be placed underneath the vehicle and moved to a stored position within the vehicle without requiring the detachment of the flexible line from the vehicle, whereby the line can remain attached to the vehicle and the oil catch pan can be moved back and forth between a position underneath the vehicle and a stored position in the vehicle without detaching the flexible line.

30. The method of claim 29 wherein the flexible line includes an elongated chain.

* * * * *